INVENTOR.
MAURICE A. LOEBELL
BY Chester Tietig
ATTORNEY.

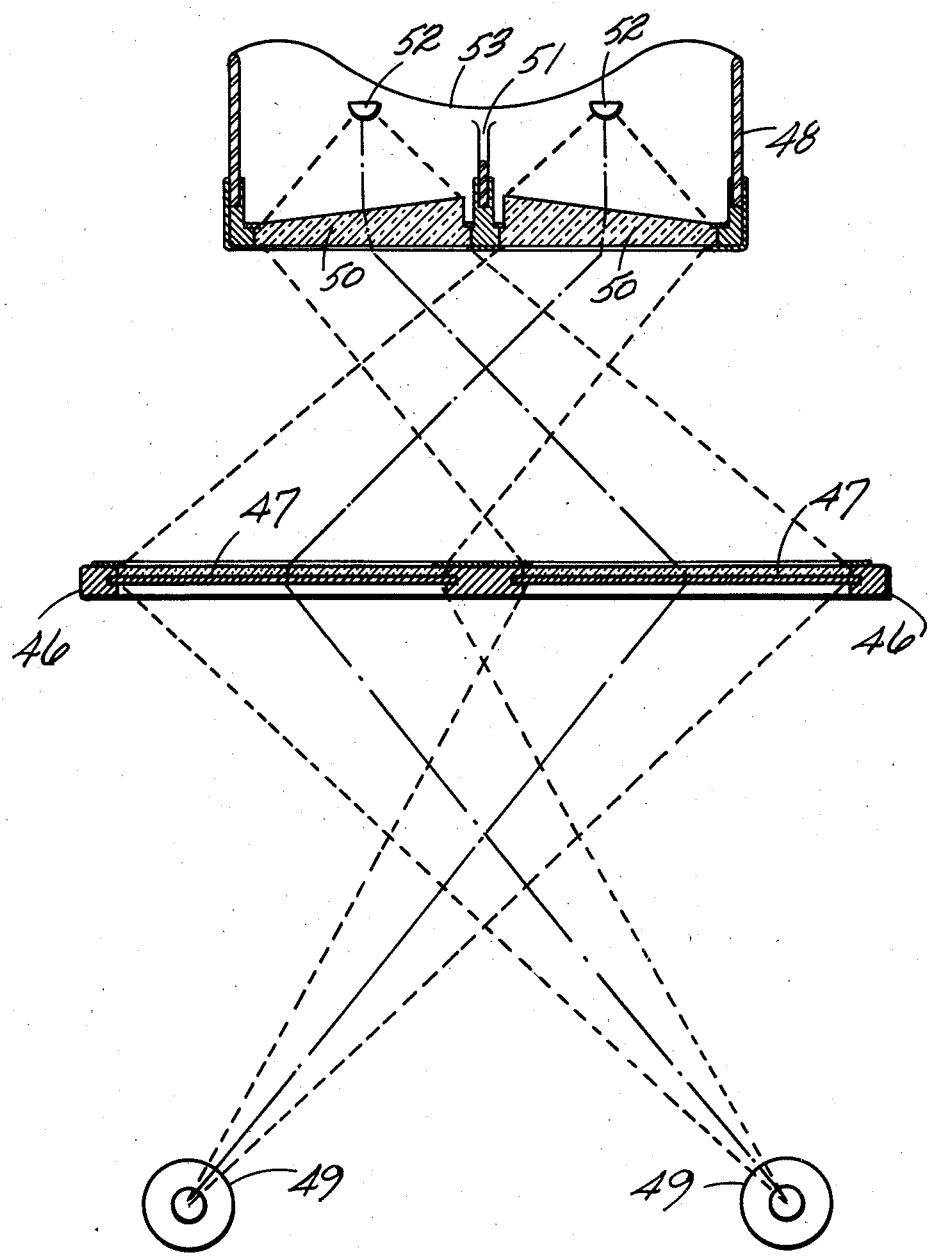

July 16, 1940. M. A. LOEBELL 2,207,867
APPARATUS FOR VISUALIZING ORGANS
Filed July 14, 1939  4 Sheets-Sheet 4

INVENTOR.
MAURICE A. LOEBELL
BY Chester Tietz
ATTORNEY.

Patented July 16, 1940

2,207,867

UNITED STATES PATENT OFFICE 2,207,867

APPARATUS FOR VISUALIZING ORGANS

Maurice A. Loebell, Zanesville, Ohio

Application July 14, 1939, Serial No. 284,509

7 Claims. (Cl. 250—61.5)

This invention relates to an apparatus for visualizing organs or structures within a body by means of X-rays. The object of the invention is to produce a clear cut image of an organ or structure which appears very sharp and clear upon a photographic plate or fluoroscopic screen while the remainder of the body in the field of view is hazy and indistinct.

A further object of the invention is to provide an apparatus in which a plurality of sharp images created according to my invention may be observed together stereoscopically.

In the accompanying drawings,

Figure 4 is a schematic illustration of an arrangement including a novel view box for viewing films stereoscopically according to my invention.

Figure 1:
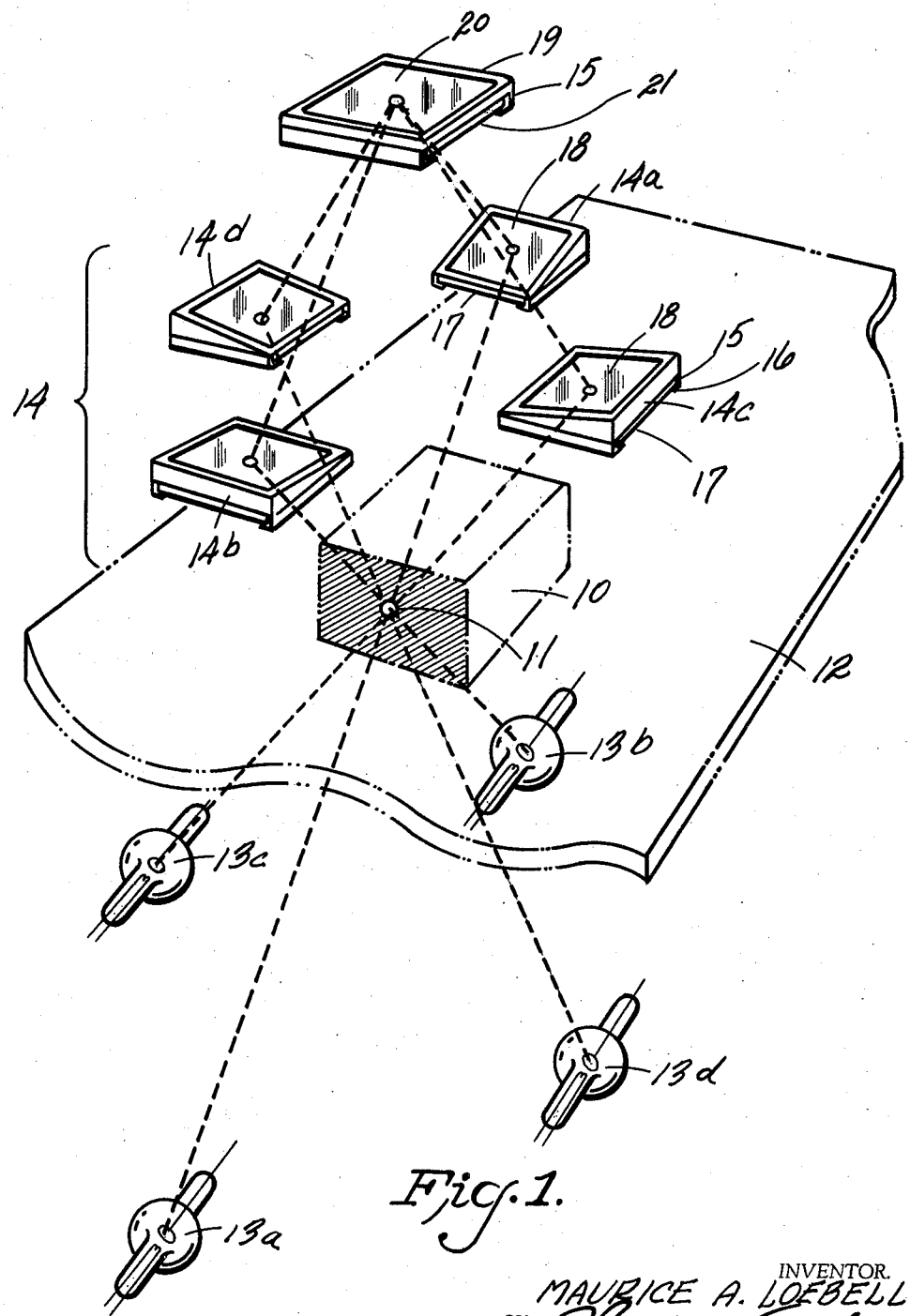
Figure 1 is a schematic perspective view, illustrating the principle of my invention.

Referring now to Figure 1, 10 is an object transparent to X-rays, in the interior of which there is a locus 11 which it is desired to photograph or observe fluoroscopically. The object rests upon an X-ray transparent table 12. Below the table there are two or more X-ray tubes, in this case four, 13a, 13b, 13c and 13d. While it is possible to get good results by the employment of only one pair of X-ray tubes, i. e., either pair 13a and 13b or pair 13c and 13d, still, as many tubes may be employed as desired. Increasing the number of X-ray tubes increases the sharpness of the image which will be photographed or viewed fluoroscopically.

Above the table 12 and the object 10 there is a plurality of assemblies 14 of which four are shown. These are arranged to correspond with the numbering of the X-ray tubes and are denominated 14a, 14b, 14c, and 14d, the radiation from which each receives respectively. These assemblies comprise a metal frame 15 provided with internally projecting flanges 16 for the reception of a fluorescent screen 17 of the kind ordinarily used for fluoroscopy. Mounted over the screen is a glass prism 18 adapted to cause visible light to be deflected to a viewing assembly 19 which is mounted centrally and above the four X-ray converting assemblies 14. The view assembly 19 is also provided with a metal frame, similar to 15 into which a film may be slid. Above the frame is mounted a flat ground glass 20, upon which a visible image is to be cast.

The operation of the system schematically shown in Figure 1, is as follows:

X-ray tube 13a projects its beam through table 12 and through object 10 and through locus 11 therein to the fluorescent screen 17 in viewing assembly 14a. The X-ray beam is there converted into an image defined in visible light. The screen 17 is arranged with its coated side up. The fluorescent image is therefore transmitted as visible light through the prism 18 which redirects the visible beam so that it is directed on to the under side of the ground glass 20, if fluoroscopy is the object of the procedure. If radiography were desired, the image would be directed to a photographic film 21 under the ground glass surface while general conditions of darkness, except for the image which it is desired to photograph, would be observed around the apparatus. Even for fluoroscopy, such conditions of darkness are desirable. Each of the other X-ray beams follow analogous paths as shown by the dotted lines in Figure 1.

The result obtained is that four images in visible light of locus 11 are projected simultaneously and superposedly upon ground glass 20. Assembly 19 may, together with the X-ray tubes and X-ray converters, be raised or lowered or otherwise moved to choose the images which are to be brought sharply in focus. The quadruple image shown upon the ground glass 20 is sharply intensified because of its plurality. Other parts of object 10, not being in focus do not have their images superposed, consequently the images of such parts do not register with each other and are therefore indistinct. As a result, they have no tendency to distract the observer's attention from the image of locus 11 which it is desired to observe minutely. It is evident that one pair of tubes, say 13a and 13b or 13c and 13d will also do the work, the other pair being dispensed with.

Figure 2:
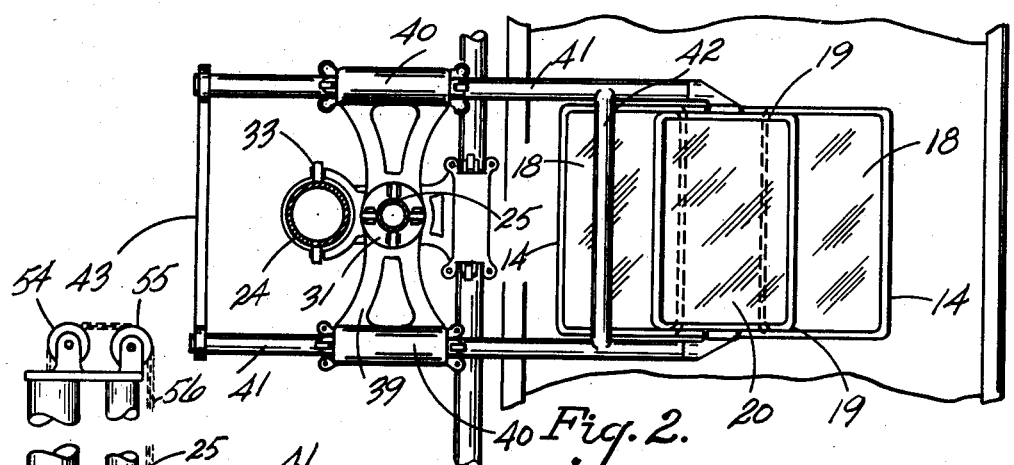
Figure 2 is a plan view of the carriage of my apparatus which carries and shifts the elements shown in Figure 1.
Figure 3:
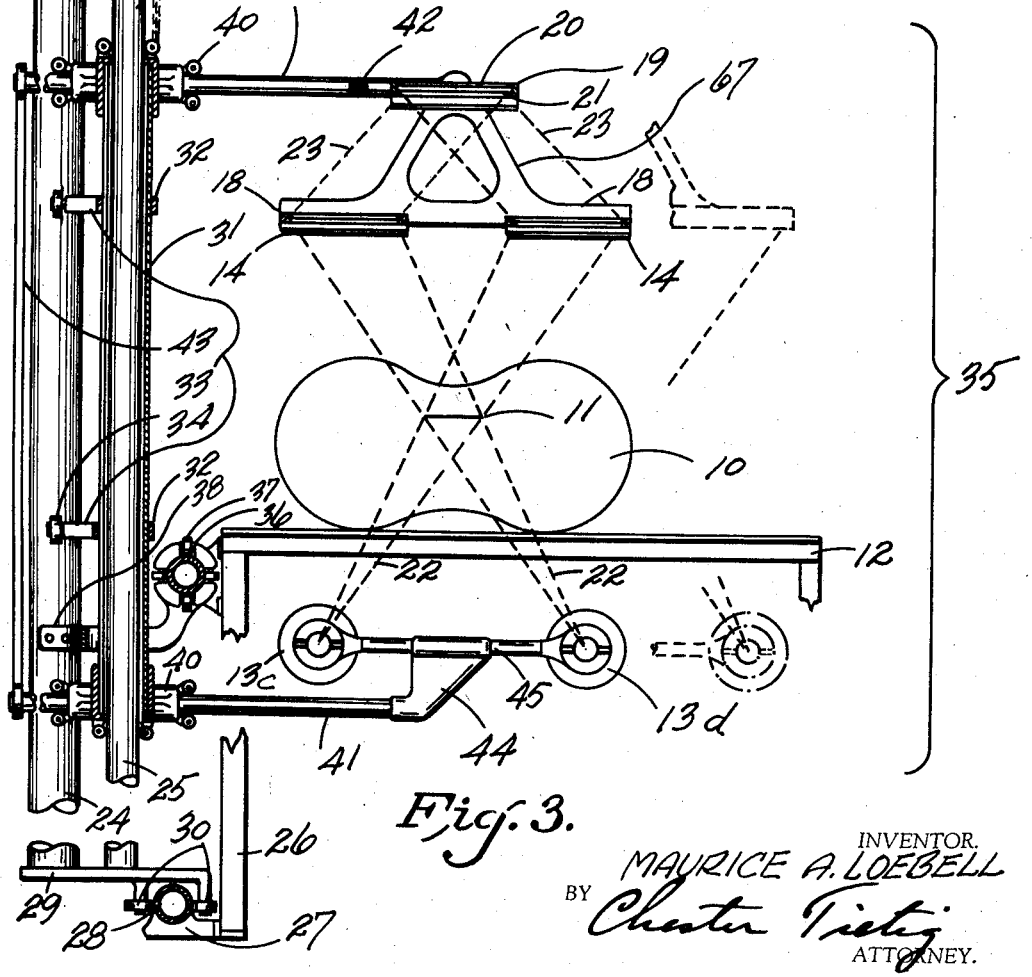
Figure 3 is a side elevation of the carriage shown in Figure 2, together with part of the framework to which it is attached.

Referring now to Figures 2 and 3, these figures show an actual embodiment of an apparatus suitable for proceeding according to the method disclosed in the explanation of the construction and operation of the apparatus of Figure 1. In Figure 3, 10 is the object to be observed, this being for example a cross section of a human body. The diamond shaped area enclosed within dotted lines within this body is the locus 11. The X-ray tubes of which only two are here shown are 13c and 13d respectively. The X-ray converting assemblies are again 14 and the X-ray beams 22 are shown in dotted line. The table is 12. Visible light beams 23 are shown as dotted lines between the X-ray converter 14 and the viewing assembly 19.

The X-ray tubes, converters and view plate are movable together but the table 12 is fixed. By such an arrangement the place of crossing of the X-rays in the object to be inspected can be shifted at will in all directions, but the focus of the superposed images on the viewing plate is not disturbed. The arrangement of the framework or standard by which the foregoing elements are supported, is as follows:

In Figures 2 and 3, 24 is a hollow column adapted for the reception of a counterweight. 25 is a solid column between column 24 and the table. 54 and 55 are sheave wheels over said columns respectively and 56 is a cable extending between the counterweight (not shown) and a carriage 35, and table 12. 26 is a table leg to which is attached a rail base 27 and a rail 28 which is co-extensive with the length of the table. Both columns terminate in a foot or base 29 which is provided with horizontally disposed rollers 30 which are adapted to roll on the sides of rail 28. Any other conventional arrangement for traverse may be substituted. Column 25 is encircled by a sleeve 31 which is slidable vertically on the column. 32 is a plurality of rings tightly attached to sleeve 31 and terminating in split tail portions 33 bearing rollers 34 which are traversable vertically on column 24. The purpose of the rings 32 and their tail attachment is to prevent rotation or even partial rotation of the carriage 35 while permitting vertical traverse. The columns are also attached near the upper edge of table 12 by means of a second rail 36 upon which a sleeve 37 may run, said sleeve being attached to the columns by means of a pronged strap 38. This arrangement is also conventional.

Supported at one side of column 25 by a saddle casting 39, there is a pair of horizontal sleeves 40 as shown in Figure 2. Through each sleeve there extends horizontal arm 41 which is slidable therein. Each of said arms is joined to the other by a forward cross-tie 42 and a rear cross-tie 43 which is behind column 24.

The saddle casting 39, the sleeves 40 and the arms 41 are duplicated below the table with the exception that the lower arms are utilized to carry X-ray tubes instead of the apparatus shortly to be described as being attached to the upper arms. It is to be observed however, that both the upper and lower horizontal extension arms 41 are constrained to move simultaneously and in register because they are tied together by rear horizontal and vertical tie pieces 43 which also act as a spacing and alignment means. However, 43 are not the only members so to act because vertical sleeve 31 also holds horizontal sleeves 40 rigidly spaced apart so that an exact distance between upper and lower arms 41 is always exactly maintained.

At the end of lower horizontal extension arm 41 there is an elbow casting 44 through which is mounted a horizontal tubular bar 45 which is parallel to arm 41. Each one of the ends of bar 45 carries an X-ray tube 13c and 13d respectively. Both arms 41 and 45 and the casting 44 are preferably hollow for the reception of electrical conductors (not shown).

The following elements are attached to the rightward end of upper arm 41, as shown in Figure 3:

67 is an A shaped casting which is a support for the converters or screens 14 together with their associated prisms 18 and frames 15. At the apex of casting 67, the viewplate 19 is mounted. It is held between the two upper extensible arms 41, as shown in Figure 2. The construction shown and described confers satisfactory rigidity upon the entire assembly even when fully extended over the table 12.

The angle made by the prisms 18 may be subject to some variation although each prism used should have the same angle as the others. However, the angle employed by all prisms may be altered to conform to different distances between the viewplate and the converter if all prisms are varied simultaneously and uniformly. The distance between the upper extension arms 41 and lower extension arms 41 is also not governed by any set rule. It should be long enough to permit the easy ingress and egress of patients to the table but should not be unnecessarily long since the sharpness of the image transmitted by the X-ray beams will suffer if the distance traversed by such beams are unduly lengthened.

Referring now to Figure 4 and subsequent figures, the binocular aspects of the invention will be discussed. 49—49 are spaced sources of visible light, preferably ordinary electric lamps. 46 is a unit consolidated of two supports for similar developed photographic films 47, i. e., films taken simultaneously which bear the same images and are of the same scale. 18—18 are the same kind of prisms used in converters 14 and are also supported by structure 46 in close contact with films or plates 47. The prisms 18 are employed to again cross the beams of visible light transmitted through the films 47. 48 is a binocular viewbox in which 50—50 are spaced prisms, the height of which increases toward a nose support 51. In the drawings 52—52 represents a pair of eyes. The distance to which the eyes may approach the prisms is limited by the presence of the nose piece 51 so that the eyes can not approach closer than a proper reading distance. The space relations between light sources 49 and films 47 and prisms 50 are identical with those in the apparatus such as shown in Figures 1, 2 and 3 and which were employed when the films were exposed simultaneously to X-rays. In that case, the films were slid in frames 15 of the converters so as to rest on flanges 16. In other words, the apparatus of Figure 3 was used for radiography by so doing, instead of the usual fluoroscopy. The films having been exposed, developed and otherwise finished were then inserted in the double film holder or plate holder 46. It is now the object of the operator to see the field within the patient or other subject examined which was apparent during the fluoroscopic examination. He is able to do this because prisms 50 straighten the beams of visible light within the viewbox to direct them straight into the observer's eyes. The size of the box 48 serves to exclude other light while this operation is in progress. At one portion of the side walls of the box, there is a sloping depression 53 for the accommodation of the observer's forehead. The employment of the prism system enables the entire viewing system to be condensed into a smaller space than would otherwise be possible and enables the images to be separated so as to produce a binocular effect.

Figures 5, 6:
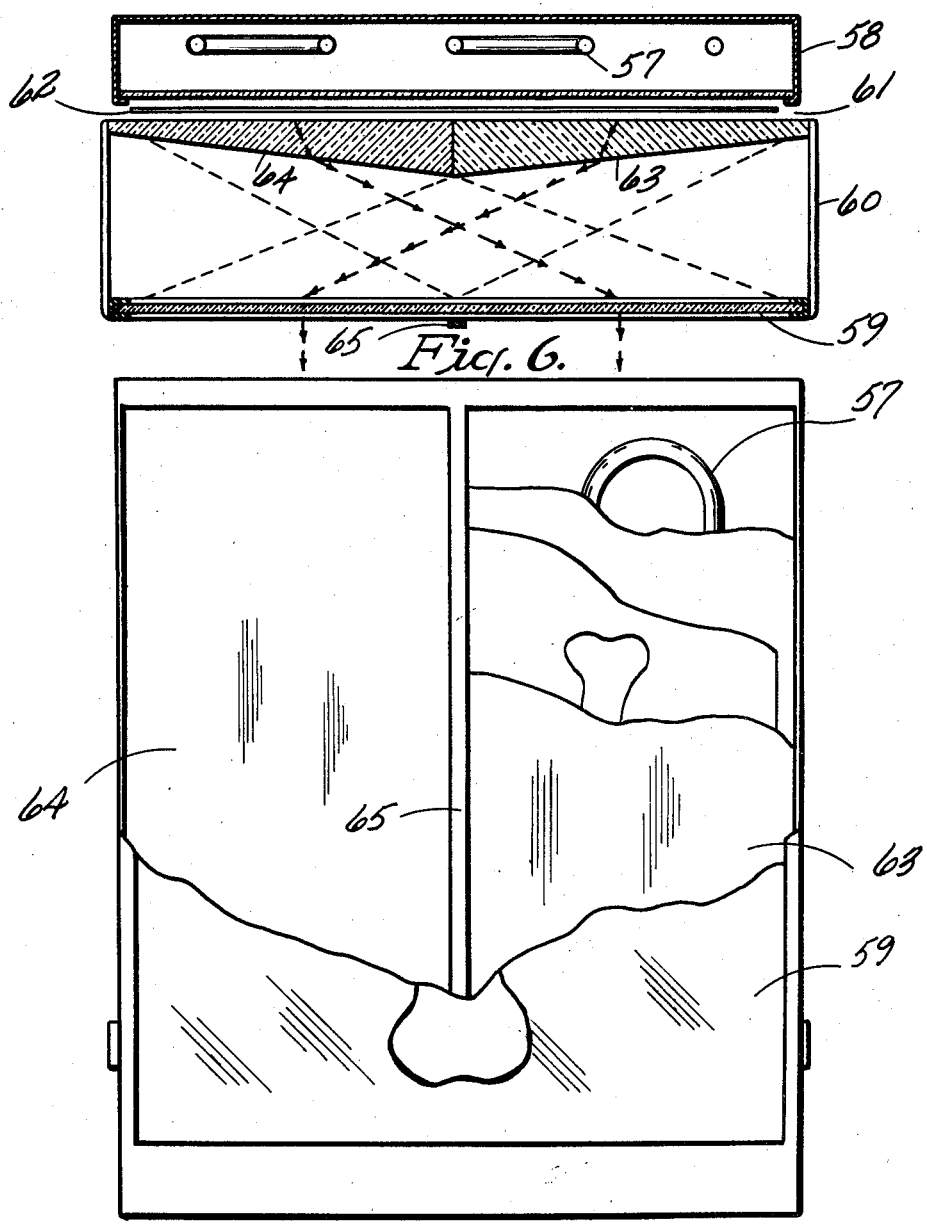
Figure 5 is a front elevation of a modification of my view box.
Figure 6 is a cross section of the view box taken on the line 6—6 of Figure 5.

Referring now to Figures 5 and 6, 57 is a continuous length of gas-filled tubing of the neon type, said tubing adapted to furnish a greenish or white light. The tubing is contained in a separate light box 58 which is to the rear of a viewing plate 59 which is made preferably of the customary flashed opal glass, other methods of illumination may also be employed. Between rear light box 58 and a front prism box 60, there is a space 63 for the insertion and extraction of the film or films 62 which it is desired to view. Suitable conventional supporting devices are provided but are not shown to avoid complexity. Film 61 is made by simultaneous cross-radiation, preferably a double one, i. e., in which the same picture is duplicated on right and left sides within box 60, the front and rear of which are made of glass. There are two prisms 63 and 64 at the right and left respectively, said prisms having their apex at the vertical center line of the box as shown in Figure 6. The rear glass wall of box 60 should be clear glass, and the front wall 66 of ground glass.

No definiteness of angle is necessary for the prisms and the same is true of the thickness of the box. These factors should depend on each other, however, to the extent that the image transmitted through each should appear full size on the glass front of the box shown on the side opposite from that of the prism which transmitted it. The path of the light is shown by arrows in Figure 6 and shows that a crossing of the images takes place on a line approximately central in the box and that the length of the path traveled by the image is thereby lengthened.

In order to obtain stereoscopic vision, a partition 65 is provided vertically down the middle of the front of the box and the image brought to the front glass 59 may be observed through any suitable auxiliary device of which many are known, to aid stereoscopic vision.

The purpose of the description of Figures 5 and 6 is to indicate how radiographs produced by the insertion of films into converters 14 under the prisms thereof may be read to obtain their stereoscopic effect; or may be superposed to produce a sharp image of an interval layer or structure of a body.

The operation of the apparatus shown in Figures 1, 2, and 3 will be at once apparent from the foregoing descriptions to anyone skilled in the X-ray art. It is only necessary to have the patient 10 lie down upon the table 12 and then to place the carriage 35 over him so that the X-ray beams cross at that portion of his body which it is intended to examine. For this purpose the horizontal and vertical traverses may be employed. It is intended that the ray angles and positions of the converters and view plates be fixed at the factory so that no adjustment by the radiologist will be necessary except as before mentioned.

I claim as my invention:

1. An X-ray apparatus comprising a plurality of X-ray tubes each adapted to cast an X-ray beam, said X-ray tubes being located in laterally spaced relation and so arranged that their beams intersect at a common locus within the body of an object to be examined, a plurality of fluorescent screens so located as to intercept said beams and convert them into images, a view plate composed of translucent material and means for projecting said images in superposed relation upon one face only of the view plate to produce thereon a clear composite picture of a specified area common to the plurality of images for observation upon the opposite face of the view plate.

2. An X-ray apparatus comprising a plurality of X-ray tubes each adapted to cast an X-ray beam, said X-ray tubes being located in laterally spaced relation and so arranged that their beams intersect at a common locus within the body of an object to be examined, a plurality of fluorescent screens so located as to intercept said beams and convert them into images, a photographic plate holder and means for projecting said images in superposed relation upon one face only of a photographic plate retained by the holder to produce thereon a clear composite picture of a specified area common to the plurality of images.

3. An X-ray apparatus comprising a vertically adjustable carriage adapted to be positioned adjacent a table designed to support an object to be examined, a plurality of X-ray tubes each adapted to cast an X-ray beam, said X-ray tubes being mounted upon the carriage in laterally spaced relation and so arranged that their beams intersect at a common locus within the body of the object under examination, a plurality of fluorescent screens mounted on the carriage and so located as to intercept said beams and convert them into images, a view plate composed of translucent material mounted upon the carriage and means associated with the fluorescent screens for projecting said images in superposed relation upon one face only of the view plate to produce thereon a clear composite picture of a specified area common to the plurality of images for observation upon the opposite side of the view plate, the arrangement being such that the X-ray tubes, fluorescent screens, view plate and projection means are vertically adjustable as a unit with the carriage.

4. An X-ray apparatus according to claim 3 in which the carriage is provided with upper and lower arms adapted to extend respectively into positions above and below the table and in which the X-ray tubes are mounted upon the lower arm and the fluorescent screens, view plate and projection means are mounted upon the upper arm.

5. An X-ray apparatus according to claim 3 in which the view plate is composed of ground glass.

6. An X-ray apparatus according to claim 3 in which the carriage is provided with upper and lower arms adapted to extend respectively into positions above and below the table and in which the X-ray tubes are mounted upon the lower arm and the fluorescent screens, photographic plate holder and projection means are mounted upon the upper arm.

7. An X-ray apparatus comprising a plurality of X-ray tubes each adapted to cast an X-ray beam, said X-ray tubes being located in laterally spaced relation and so arranged that their beams intersect at a common locus within the body of an object to be examined, a plurality of fluorescent screens so located as to intercept said beams and convert them into images, a combined view plate and photographic plate holder including a window of translucent material and means to retain a photographic plate in line therewith, and means for projecting said images in superposed relation upon one face only of the window to produce thereon a clear composite picture of a specified area common to the plurality of images upon the opposite face of the window for visual observation and photographic recording.

MAURICE A. LOEBELL.